(12) United States Patent
Foag

(10) Patent No.: US 12,370,899 B2
(45) Date of Patent: Jul. 29, 2025

(54) METHOD AND APPARATUS FOR CONTROLLING AN ELECTRIC MACHINE DURING A RECUPERATION PROCESS

(71) Applicant: Bayerische Motoren Werke Aktiengesellschaft, Munich (DE)

(72) Inventor: Werner Foag, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 196 days.

(21) Appl. No.: 18/021,872

(22) PCT Filed: Jul. 22, 2021

(86) PCT No.: PCT/EP2021/070462
§ 371 (c)(1),
(2) Date: Feb. 17, 2023

(87) PCT Pub. No.: WO2022/037892
PCT Pub. Date: Feb. 24, 2022

(65) Prior Publication Data
US 2023/0311667 A1    Oct. 5, 2023

(30) Foreign Application Priority Data
Aug. 19, 2020   (DE) .................. 10 2020 121 695.5

(51) Int. Cl.
*B60L 7/26* (2006.01)
*B60L 3/10* (2006.01)
(Continued)

(52) U.S. Cl.
CPC ............... *B60L 7/26* (2013.01); *B60L 3/108* (2013.01); *B60T 1/10* (2013.01); *B60T 13/586* (2013.01);
(Continued)

(58) Field of Classification Search
CPC ....... B60W 30/18127; B60W 2720/403; B60L 7/18; B60L 7/26; B60L 2260/28;
(Continued)

(56) References Cited

U.S. PATENT DOCUMENTS 5,343,971 A * 9/1994 Heidelberg ........... B60W 10/08
180/65.245
6,406,105 B1 * 6/2002 Shimada .................. B60L 7/26
303/152

(Continued)

FOREIGN PATENT DOCUMENTS

CN    104276031 A    1/2015
CN    106564404 A    4/2017
(Continued)

OTHER PUBLICATIONS

EPO machine translation of JP 2002058107 A (original JP document published Feb. 22, 2002) (Year: 2002).*
(Continued)

*Primary Examiner* — David A Testardi
(74) *Attorney, Agent, or Firm* — Crowell & Moring LLP

(57) ABSTRACT

An apparatus for operating an electric machine of a vehicle during a recuperation process is provided. The vehicle includes a first electric machine which is coupled to a first axle of the vehicle, and a second electric machine which can be coupled to a second axle of the vehicle. The apparatus is configured to determine, on the basis of sensor data from one or more sensors in the vehicle, whether the second electric machine should be used to recuperate electric energy during a recuperation process in addition to the first electric machine. The apparatus is also configured, depending on this determination, to operate the second electric machine during the recuperation process in order to recuperate electric energy.

13 Claims, 1 Drawing Sheet

(51) Int. Cl.
*B60T 1/10* (2006.01)
*B60T 13/58* (2006.01)
*B60W 30/18* (2012.01)

(52) U.S. Cl.
CPC ..... *B60L 2240/12* (2013.01); *B60L 2240/423* (2013.01); *B60L 2240/622* (2013.01); *B60T 2270/608* (2013.01)

(58) Field of Classification Search
CPC . B60K 6/52; B60T 1/10; B60T 13/586; B60T 2270/608
See application file for complete search history.

(56) References Cited

U.S. PATENT DOCUMENTS

| | | | |
|---|---|---|---|
| 2002/0023789 A1 | 2/2002 | Morisawa et al. | |
| 2002/0180266 A1* | 12/2002 | Hara | B60W 30/18109 903/918 |
| 2004/0104699 A1* | 6/2004 | Nishikawa | B60K 6/44 180/65.225 |
| 2004/0238244 A1* | 12/2004 | Amanuma | B60L 7/26 903/917 |
| 2005/0099146 A1* | 5/2005 | Nishikawa | B60L 7/18 318/63 |
| 2006/0055239 A1* | 3/2006 | Crombez | B60W 20/13 303/152 |
| 2007/0029874 A1* | 2/2007 | Finch | B60T 1/10 303/152 |
| 2009/0145673 A1* | 6/2009 | Soliman | B60K 6/442 701/22 |
| 2010/0113215 A1* | 5/2010 | Jager | B60T 8/17616 477/29 |
| 2013/0173099 A1* | 7/2013 | Takagi | B60W 30/18127 701/22 |
| 2013/0173100 A1* | 7/2013 | Takagi | B60L 3/0061 180/65.265 |
| 2014/0231165 A1* | 8/2014 | Hori | B60L 3/106 180/242 |
| 2015/0019058 A1* | 1/2015 | Georgiev | B60L 58/12 701/22 |
| 2015/0210266 A1 | 7/2015 | Yang et al. | |
| 2015/0217643 A1* | 8/2015 | Lee | B60L 7/10 701/22 |
| 2015/0298553 A1* | 10/2015 | Maiterth | B60L 7/14 701/71 |
| 2016/0264111 A1* | 9/2016 | Doi | B60T 8/267 |
| 2017/0050536 A1 | 2/2017 | Martin | |
| 2017/0120892 A1 | 5/2017 | Kato et al. | |
| 2017/0253230 A1* | 9/2017 | Yamamoto | B60L 50/61 |
| 2018/0072163 A1* | 3/2018 | Ono | B60L 15/2009 |
| 2018/0141446 A1* | 5/2018 | Weinzierl | B60L 7/26 |
| 2018/0141528 A1* | 5/2018 | Oh | B60W 30/18127 |
| 2018/0244159 A1* | 8/2018 | Satterthwaite | B60T 8/30 |
| 2021/0229646 A1* | 7/2021 | Kim | B60T 8/17551 |
| 2021/0237583 A1* | 8/2021 | Huang | F16D 61/00 |
| 2022/0001748 A1* | 1/2022 | Huh | B60L 50/61 |
| 2022/0048482 A1* | 2/2022 | Geuß | B60L 15/2009 |
| 2023/0219542 A1* | 7/2023 | Yamamoto | B60W 20/14 701/70 |

FOREIGN PATENT DOCUMENTS

| | | | | |
|---|---|---|---|---|
| CN | 108025651 A | | 5/2018 | |
| CN | 108045234 A | * | 5/2018 | ............. B60L 15/20 |
| CN | 109808500 A | | 5/2019 | |
| CN | 110920384 A | * | 3/2020 | |
| DE | 197 18 709 A1 | | 11/1997 | |
| DE | 102013209175 A1 | * | 11/2014 | ............. B60L 11/14 |
| DE | 10 2014 207 065 A1 | | 10/2015 | |
| DE | 102015105135 A1 | * | 10/2016 | ............. B60K 17/02 |
| DE | 102016204934 A1 | * | 9/2017 | ............. B60K 6/442 |
| DE | 102016014732 A1 | * | 6/2018 | |
| DE | 10 2017 213 278 A1 | | 2/2019 | |
| DE | 102018214246 A1 | * | 2/2020 | |
| DE | 10 2018 217 224 A1 | | 4/2020 | |
| JP | 2002046507 A | * | 2/2002 | ............. B60K 6/442 |
| JP | 2002058107 A | * | 2/2002 | |
| JP | 2014034335 A | * | 2/2014 | |
| JP | 2018019538 A | * | 2/2018 | |
| WO | WO-2005110827 A1 | * | 11/2005 | ............... B60T 1/10 |
| WO | WO-2006000560 A1 | * | 1/2006 | ............. B60L 3/108 |

OTHER PUBLICATIONS

EPO machine translation of DE 102013209175A1 (original DE document published Nov. 20, 2014) (Year: 2014).*
EPO machine translation of DE 102016014732A1 (original DE document published Jun. 14, 2018) (Year: 2018).*
EPO machine translation of CN108045234A (original CN document published May 18, 2018) (Year: 2018).*
EPO machine translation of CN110920384A (original CN document published Mar. 27, 2020) (Year: 2020).*
International Search Report (PCT/ISA/210) issued in PCT Application No. PCT/EP2021/070462 dated Jan. 3, 2022 with English translation (six (6) pages).
German-language Written Opinion (PCT/ISA/237) issued in PCT Application No. PCT/EP2021/070462 dated Jan. 3, 2022 (seven (7) pages).
German-language Search Report issued in German Application No. 10 2020 121 695.5 dated Apr. 21, 2021 with partial English translation (11 pages).
Chinese-language Office Action issued in Chinese Application No. 202180041565.2 dated Feb. 28, 2025 with English translation (19 pages).

* cited by examiner

METHOD AND APPARATUS FOR CONTROLLING AN ELECTRIC MACHINE DURING A RECUPERATION PROCESS

BACKGROUND AND SUMMARY OF THE INVENTION

The invention relates to a vehicle having multiple electric machines for recuperating electric energy. In particular, the invention relates to a method and a corresponding apparatus for controlling an electric machine, which can be mechanically decoupled, of a vehicle in the scope of a recuperation process.

A vehicle can have multiple electric machines to drive the vehicle. In particular, the vehicle can have a first electric machine to drive a first axle (in particular a rear axle) and a second electric machine to drive a second axle (in particular a front axle). The electric machines can be operated jointly, for example to provide an all-wheel drive of the vehicle.

Furthermore, the electric machines of the vehicle can be used to decelerate the vehicle and to recuperate electric energy at the same time, which can be stored in an electric energy storage device of the vehicle. The amount of recuperated electric energy can be increased by the recuperation of electric energy using multiple electric machines which act on multiple different axles of the vehicle. Furthermore, the stability of the driving operation of the vehicle can be increased by the deceleration of the vehicle at multiple axles. On the other hand, the use of multiple electric machines for a recuperation process can be linked to a relatively high energy expenditure for the activation of the individual electric machines.

The present document relates to the technical object of effectuating the most energy-efficient and driving-stable possible recuperation of electric energy by way of multiple electric machines of a vehicle.

The object is achieved by the claimed invention. It is to be noted that additional features of a claim dependent on an independent claim can, without the features of the independent claim or only in combination with a subset of the features of the independent claim, form a separate invention independent of the combination of all features of the independent claim, which can be made the subject matter of an independent claim, a divisional application, or a subsequent application. This applies in the same manner to technical teachings described in the description, which can form an invention independent of the features of the independent claims.

According to one aspect, an apparatus is described for operating or controlling an electric machine of a (motor) vehicle during a recuperation process (in which the electric machine typically effectuates a deceleration torque to decelerate the vehicle). The vehicle comprises a first electric machine (for example, a possibly separately-excited or permanently-excited synchronous machine), which is coupled to a first (drive) axle (for example, the rear axle) of the vehicle. The first electric machine can also be referred to as the primary electric machine. The first machine can be designed to be coupled permanently and/or continuously to the first (drive) axle.

Furthermore, the vehicle comprises a second electric machine (for example, a separately-excited synchronous machine), which can be coupled to a second (drive) axle (for example, the front axle) of the vehicle. The second electric machine can also be referred to as the secondary electric machine. The coupling or the decoupling of the second electric machine to or from the second (drive) axle can be effectuated via a clutch actuatable by the apparatus or via a transmission of the vehicle actuatable by the apparatus.

In the decoupled state, the second electric machine, in particular the shaft of the second electric machine, is typically at rest. On the other hand, the second electric machine, in particular the shaft of the second electric machine, typically rotates in the coupled (and thus recuperation-capable) state at a rotational speed which is proportional to the driving speed of the vehicle.

The amount of energy required to establish the synchronous running between the driving speed and the rotational speed of the shaft of the second electric machine typically first has to be applied upon the coupling of the second electric machine to the second axle (before the usage for recuperation), and thus initially results in an elevated energy loss.

In a friction-locked clutch, the successive closing of the clutch is typically sufficient to couple the second electric machine to the second axle, wherein the second electric machine is sped up here by the kinetic energy of the vehicle. This process already directly contributes to the deceleration of the vehicle. The potential of electric energy which can be recuperated is thus typically reduced by the coupling of the second electric machine to the second axle by way of a friction-locked clutch.

In a form-fitting clutch (for example, a claw clutch), the closing of the clutch is only possible in a speed window in the vicinity of the synchronous speed. The second electric machine therefore has to be revved up and synchronized beforehand using electric energy for this purpose, so that electric energy has to be applied before the clutch can be closed, and before a recuperation is possible by way of the second electric machine.

In both cases, a certain amount of mechanical energy is lost and cannot be used for recuperation. The rotational energy stored at the end of the recuperation process in the rotating mass of the second electric machine can be converted back into electric energy during the subsequent "putting down" again, i.e., decoupling, of the second electric machine, so that the amount of recuperated electric energy can be increased again.

The apparatus is configured to determine on the basis of sensor data from one or more sensors of the vehicle whether, in addition to the first electric machine, the second electric machine should also be used in a recuperation process for recuperating electric energy. In particular, the apparatus can be configured to recognize that a recuperation and/or deceleration process of the vehicle is to be carried out or is being carried out. This can be recognized, for example, based on the actuation of a brake pedal or a brake lever of the vehicle (by the driver of the vehicle).

Furthermore, it can be checked on the basis of the sensor data of the one or more sensors of the vehicle whether (from an energetic viewpoint) the second electric machine of the vehicle should also be used during the recuperation process for recuperating electric energy. Exemplary sensors in this case are a speed sensor, one or more surroundings sensors (in particular a distance sensor for ascertaining the distance or relative speed of the vehicle in relation to a front vehicle and/or an image camera for recognizing traffic signs), and/or a position sensor for ascertaining the present position of the vehicle (within a digital map with respect to the road network traveled by the vehicle).

The apparatus can therefore be configured to predict in the preparation for or upon beginning a recuperation process, on the basis of the sensor data of one or more sensors of the vehicle, whether it is advantageous from an energetic viewpoint to also operate the second electric machine during the recuperation process. In particular, it can be predicted here whether more additional electric energy can be recuperated by the activation of the second electric machine than has to be applied for the activation of the second electric machine for the recuperation process.

The apparatus is furthermore configured, in dependence thereon (i.e., in dependence on the determination or prediction), to operate the second electric machine during the recuperation process in order to recuperate electric energy. In particular, the apparatus can be configured to operate the second electric machine during the recuperation process if it has been determined that the second electric machine is supposed to be operated during the recuperation process. For this purpose, the apparatus can be configured to cause the second electric machine to be coupled to the second axle for the recuperation process (for example, by closing the clutch between the second electric machine and the second axle). Alternatively or additionally, the apparatus can be configured to cause an exciter current through an exciter winding of the second electric machine for the recuperation process (in order to be able to operate the second electric machine as a generator).

On the other hand, the operation of the second electric machine can be suppressed (for example, by decoupling of the second electric machine from the second axle and/or by suppression of an exciter current through the exciter winding of the second electric machine), if it has been determined that the second electric machine is not supposed to be operated.

Upon the activation and/or coupling and/or upon the operation of the second electric machine, the dead time can be taken into consideration, which is required to bring the second electric machine to synchronous speed and mechanically couple it to the second (drive) axle. It is typically not yet possible to recuperate via the second electric machine during the dead time.

In particular, the apparatus can be configured to predict a starting point in time of the (upcoming) recuperation process. Furthermore, the apparatus can be configured to cause the second electric machine to be coupled on and/or activated by the predefined dead time before the predicted starting point in time, in order to have the effect that the second electric machine can be operated for recuperating electric energy from the starting point in time of the recuperation process. The energy efficiency and/or the driving stability of the vehicle can thus be further increased.

The apparatus described in this document thus makes it possible to predict on the basis of sensor data from one or more sensors of the vehicle whether it is advisable from an energetic viewpoint for the present or directly upcoming recuperation process to invest energy in the activation of the second electric machine, in order to also use the second electric machine for the recuperation process in addition to the first electric machine, so that the amount of recuperated electric energy can be increased, and so that at the same time the driving stability of the vehicle can be improved during the recuperation and/or deceleration process.

The apparatus can be configured, on the basis of sensor data of the one or more sensors of the vehicle, to predict an amount of recuperation energy which can be recuperated during the recuperation process (possibly in total). In particular, the amount of recuperation energy can be predicted which can additionally be recuperated due to the additional use of the second electric machine.

It can then be determined on the basis of the predicted amount of recuperation energy, in particular in dependence on a comparison of the predicted amount of recuperation energy to an energy threshold value, whether the second electric machine should also be used during the recuperation process in addition to the first electric machine. The energy threshold value can be dependent here on the amount of energy (or can correspond to the amount of energy), which has to be applied to activate the second electric machine for the recuperation process.

A selective activation of the second electric machine can be effectuated in a particularly reliable and energy-efficient manner by the prediction of the amount of recuperation energy for the present or directly upcoming recuperation process.

The apparatus can be configured to determine on the basis of sensor data with respect to the actual driving speed of the vehicle at the beginning of the recuperation process whether the second electric machine should also be used in addition to the first electric machine during the recuperation process. The actual driving speed of the vehicle can be indicated here by a speed sensor of the vehicle. In particular, the apparatus can be configured to determine that the second electric machine should also be used in addition to the first electric machine during the recuperation process when (possibly only when) the actual driving speed is greater than or equal to a speed threshold value. Alternatively or additionally, the apparatus can be configured to determine that the second electric machine should not be used in the recuperation process when (possibly always when) the actual driving speed is less than the speed threshold value. The speed threshold value can be dependent here on the amount of energy which has to be applied to activate the second electric machine for the recuperation process.

Due to the ascertainment and due to the consideration of the actual driving speed of the vehicle at the beginning of the recuperation process, a selective activation of the second electric machine can be effectuated in a particularly efficient manner to further increase the energy efficiency of the vehicle.

The apparatus can be configured to predict a target driving speed of the vehicle at the end of the recuperation process on the basis of sensor data of the one or more sensors of the vehicle. In particular, it can be predicted on the basis of the sensor data at which target driving speed the vehicle will drive at the end of the recuperation process (and thus how strongly the vehicle will presumably have to be decelerated in the scope of the recuperation process).

It can then be determined in a particularly precise and reliable manner on the basis of the actual driving speed at the beginning of the recuperation process and on the basis of the predicted target driving speed at the end of the recuperation process whether the second electric machine should also be used in addition to the first electric machine during the recuperation process. In particular, the (additional or overall) amount of recuperation energy to be recuperated for the recuperation process can be predicted in a precise manner on the basis of the actual driving speed and on the basis of the target driving speed. A selective activation of the second electric machine can be effectuated in a particularly reliable manner by the prediction of the target driving speed (for example, on the basis of the surroundings data from one or more surroundings sensors, for example on the basis of the sensor data of a camera or on the basis of the sensor data of a distance sensor of the vehicle), in order to further increase the energy efficiency of the vehicle.

The apparatus can be configured, on the basis of sensor data with respect to the position of the vehicle (for example, on the basis of the GPS coordinates of the vehicle) and on the basis of a digital map with respect to the road network traveled by the vehicle, to predict the target driving speed of the vehicle at the end of the recuperation process. Alternatively or additionally, the apparatus can be configured, on the basis of sensor data with respect to the position of the vehicle (for example, on the basis of the GPS coordinates of the vehicle) and on the basis of a digital map with respect to the road network traveled by the vehicle, to determine whether the second electric machine should also be used in addition to the first electric machine during the recuperation process. By way of the consideration of position data and a digital map, for example, the course of the presently traveled roadway can be ascertained to predict the amount of recuperation energy to be recuperated in the recuperation process in a precise manner in dependence on the course of the presently traveled roadway. A selective activation of the second electric machine can thus be effectuated in a particularly reliable manner to further increase the energy efficiency of the vehicle.

The apparatus can be configured, on the basis of a driving route of the vehicle planned on a navigation system of the vehicle and on the basis of sensor data with respect to the position of the vehicle (for example, on the basis of the GPS coordinates of the vehicle), possibly in conjunction with the digital map, to predict the target driving speed of the vehicle at the end of the recuperation process. Alternatively or additionally, the apparatus can be configured, on the basis of the driving route of the vehicle planned on the navigation system of the vehicle and on the basis of sensor data with respect to the position of the vehicle (for example, on the basis of the GPS coordinates of the vehicle), possibly in conjunction with the digital map, to determine whether the second electric machine should also be used in addition to the first electric machine during the recuperation process. For example, it can be recognized on the basis of the planned driving route that the recuperation process takes place in conjunction with a turning-off process. Based on such information, the amount of recuperation energy of the recuperation process can then be predicted in a particularly precise manner (to enable selective activation of the second electric machine).

The apparatus can be configured, on the basis of sensor data with respect to a front vehicle driving (directly) in front of the vehicle (for example, on the basis of data with respect to the distance to the front vehicle and/or with respect to the driving speed of the front vehicle), to predict the target driving speed of the vehicle at the end of the recuperation process. Alternatively or additionally, the apparatus can be configured, on the basis of sensor data with respect to the front vehicle driving (directly) in front of the vehicle (for example, on the basis of data with respect to the distance to the front vehicle and/or with respect to the driving speed of the front vehicle), to determine whether the second electric machine should also be used in addition to the first electric machine in the recuperation process. A selective activation of the second electric machine can thus be enabled in a particularly reliable manner.

The apparatus can be configured to determine, on the basis of the sensor data of the one or more sensors (for example, wheel speed sensors for the wheels of the first and/or second axle) of the vehicle, whether the second electric machine should be used to recuperate electric energy in addition to the first electric machine to ensure the driving stability of the vehicle in the recuperation process. Therefore, additionally and/or alternatively to the observation of the energy efficiency, the driving stability of the vehicle during a recuperation process can be observed to decide whether the second electric machine is used for the recuperation process.

In particular, the apparatus can be configured to ascertain information with respect to the coefficient of friction of the roadway traveled by the vehicle on the basis of the sensor data of the one or more sensors (for example, the wheel speed sensors) of the vehicle. A lower coefficient of friction typically results here in an increased tendency toward use of the second electric machine for the recuperation process.

Alternatively or additionally, the apparatus can be configured to ascertain information with respect to the deceleration value to be effectuated during the recuperation process on the basis of the sensor data of the one or more sensors (for example, a radar sensor) of the vehicle. The tendency to use the second electric machine for the recuperation process typically increases here with increasing deceleration value.

It can then be determined in a particularly precise manner on the basis of the information with respect to the coefficient of friction and/or with respect to the deceleration value whether the second electric machine should be used for the recuperation of electric energy in addition to the first electric machine to ensure the driving stability of the vehicle during the recuperation process.

The apparatus can therefore be configured to take into consideration, in addition to the energy consideration, an ascertainment or estimation of the roadway coefficient of friction and/or the reserves of driving-dynamics stability of the vehicle. This information can be ascertained in particular from the comparison of the wheel speeds and/or from other driving-dynamics data, for example from the electronic stability program (ESP).

In dependence on the ascertained information, the energy threshold value for activating the second electric machine for the recuperation process can be adapted, in particular reduced. In particular, the energy threshold value can be reduced with falling coefficient of friction and/or with rising deceleration value. Alternatively or additionally, the energy threshold value can be increased with rising coefficient of friction and/or with falling deceleration value.

Furthermore, the apparatus can be configured to switch over to a permanently coupled operation of the two electric machines in dependence on the ascertained information (in particular in the case of significantly reduced stability reserves of the vehicle, for example in the case of a coefficient of friction which is below a specific coefficient of friction threshold value), wherein the permanently coupled operation of the two electric machines can also be maintained during driving travel conditions.

According to a further aspect, a (road) motor vehicle (in particular a passenger vehicle or a truck or bus or motorcycle) is described, which comprises the (control) apparatus described in this document.

According to a further aspect, a method is described for operating or controlling an electric machine of a vehicle during a recuperation process. The vehicle comprises a first electric machine which is coupled to a first axle of the vehicle and a second electric machine which can be coupled to a second axle of the vehicle.

The method comprises the determination, on the basis of sensor data from one or more sensors (in particular a speed sensor, a surroundings sensor, and/or a position sensor) of the vehicle, of whether the second electric machine should also be used in addition to the first electric machine during a (present or directly upcoming) recuperation process for recuperating electric energy. The method furthermore comprises operating the second electric machine during the recuperation process in dependence thereon, in order to recuperate electric energy during the recuperation process.

According to a further aspect, a software (SW) program is described. The SW program can be configured to be executed on a processor (for example, on a control unit of a vehicle), and to thus carry out the method described in this document.

According to a further aspect, a storage medium is described. The storage medium can comprise a SW program which is configured to be executed on a processor, and to thus carry out the method described in this document.

It is to be noted that the methods, apparatuses, and systems described in this document can be used both alone and also in combination with other methods, apparatuses, and systems described in this document. Furthermore, any aspects of the methods, apparatuses, and systems described in this document can be combined with one another in manifold ways. In particular, the features of the claims can be combined with one another in manifold ways.

The invention is described in more detail hereinafter on the basis of exemplary embodiments.

DETAILED DESCRIPTION OF THE DRAWINGS

Figure 1:
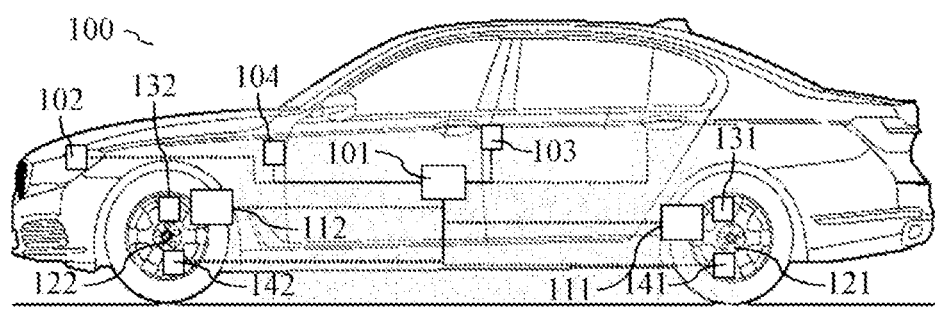
FIG. 1 shows an exemplary vehicle having multiple electric machines.

As described at the outset, the present document relates to the most energy-efficient and stable possible operation of a vehicle having multiple electric machines during a recuperation process. In this context, FIG. 1 shows an exemplary vehicle 100 having a first axle 121 (for example, the rear axle), which can be coupled or is coupled to a first electric machine 111. Furthermore, the vehicle 100 comprises a second axle 122 (for example, the front axle), which can be coupled or is coupled to a second electric machine 122. The coupling or decoupling of an electric machine 111, 112 to or from the respective axle 121, 122 can be effectuated in each case by a clutch 131, 132.

The vehicle 100 can comprise a control apparatus 101 (for example, a control unit), which is configured to control the one or more electric machines 111, 112 and/or the one or more clutches 131, 132, for example to effectuate a specific drive torque to drive the vehicle 100 and/or to effectuate a deceleration torque to decelerate the vehicle 100. The control of the one or more electric machines 111, 112 and/or the one or more clutches 131, 132 can take place in dependence on a setpoint torque, which is requested, for example, by a driver of the vehicle 100 via the accelerator pedal or via the brake pedal of the vehicle 100 (not shown).

The vehicle 100 can furthermore comprise one or more surroundings sensors 102, for example a camera and/or a distance sensor, such as a radar sensor, which are configured to acquire sensor data (in this document also referred to as surroundings data) with respect to the surroundings of the vehicle 100 (in particular with respect to a front vehicle driving in front of the vehicle 100). Furthermore, the vehicle 100 can comprise a position sensor 103 (for example, a GPS receiver), which is configured to acquire sensor data (in this document also referred to as position data) with respect to the position of the vehicle 100. In addition, the vehicle 100 can comprise at least one driving sensor 104, which is configured to acquire sensor data (in this document also referred to as driving data) with respect to the driving state, in particular with respect to the driving speed, of the vehicle 100.

In a vehicle 100, in particular in a BEV (battery electric vehicle), having in each case at least one electric machine 111, 112 per axle 121, 122, both electric machines 111, 112 can be used not only for the drive, but also for the braking energy reclamation. The maximum achievable recuperation deceleration and the driving stability of the vehicle 100 can be increased by the joint operation of the electric machines 111, 112.

The use of an electric machine 111, 112, in particular a separately-excited electric machine, for recuperation initially requires a specific energy or power offset in the form of an exciter current of the electric machine 111, 112, in order to build up the magnetic field of the electric machine 111, 112. Furthermore, the shaft of the decoupled electric machine 112 has to be accelerated to the speed of the axle 122 upon coupling of the electric machine 112 to the respective axle 122, which also results in an energy loss. As a result thereof, it can possibly be inefficient from an energetic aspect to use both electric machines 111, 112 for braking recuperation of the vehicle 100. In particular, it can possibly be inefficient to couple the second electric machine 112 to the second axle 122 especially for a recuperation process for braking recuperation if the vehicle 100 was operated before beginning the recuperation process using only one drive axle 121 and the other drive axle 122 was mechanically decoupled.

One possibility for optimizing the energy efficiency in conjunction with the braking recuperation is to only activate the second electric machine 112 from a specific deceleration threshold value (for example, from a deceleration threshold value of 0.1 g or more). The deceleration threshold value can represent a compromise between driving stability and energy efficiency here. The definition of a deceleration threshold value can have the result, however, that the amount of energy required for the activation of the second electric machine 112 cannot be reclaimed in the scope of the recuperation process.

A further possibility is to only use the first electric machine 111 for braking recuperation up to a specific deceleration stability limit. However, this has the result that the energy exceeding the deceleration stability limit cannot be recuperated in principle.

The control apparatus 101 of the vehicle 100 can be configured to predict, on the basis of the driving data, the surroundings data, and/or the position data for an upcoming or for an already started recuperation process, whether it is advantageous from an energetic viewpoint to also use the second electric machine 112 for braking recuperation in addition to the first electric machine 111. In particular, the control apparatus 101 can be configured to predict on the basis of the driving data, the surroundings data, and/or the position data whether the amount of recuperation energy to be recuperated in the scope of the recuperation process will be greater than a specific energy threshold value, wherein it is advantageous from the energy threshold value to also use the second electric machine 112 for braking recuperation (and to activate it in a dedicated manner for the recuperation process).

The apparatus 101 can be configured to use the second electric machine 112 (possibly only then) for braking recuperation if the actual driving speed of the vehicle 100 at the beginning of the recuperation process or at the beginning of the deceleration of the vehicle 100 is greater than or equal to a specific speed threshold value. The second electric machine 112 can thus (possibly only then) be used for braking recuperation if the amount of energy to be recuperated (which is proportional to the square of the driving speed) is relatively high due to a relatively high driving speed of the vehicle 100. For example, switching on the second electric machine 112 for a recuperation process can thus be omitted entirely during a city journey, while the second electric machine 112 is used for recuperation processes during a freeway journey.

The forecast or the prediction of the amount of recuperation energy to be expected can be further improved by the consideration of further sensor data.

For example, a front vehicle driving in front of the vehicle 100, which drives at a driving speed that is only slightly below the actual driving speed of the vehicle 100, can be detected on the basis of the surroundings data. Furthermore, it can possibly be recognized that the ACC (adaptive cruise control) function of the vehicle 100 is operated. Based thereon, it can be predicted that the upcoming recuperation process has only a relatively minor change of the driving speed of the vehicle 100 and thus only a relatively minor amount of recuperation energy, so that switching on the second electric machine 112 can be omitted.

In a further example, it can be recognized on the basis of a driving route planned on a navigation system of the vehicle 100 that the vehicle 100 has to perform a relatively strong braking action (for example, to exit from a freeway). It can thus be predicted that the upcoming recuperation process has a relatively high amount of recuperation energy, and that the second electric machine 112 should thus be switched on (selectively or especially for the recuperation process).

In a further example, a strongly braking front vehicle and/or a red traffic signal can be recognized on the basis of the surroundings data. It can thus be predicted that the upcoming recuperation process has a relatively high amount of recuperation energy, and that the second electric machine 112 should therefore be switched on.

In a further example, it can be recognized on the basis of the position data of the vehicle 100 and on the basis of a digital map with respect to the road network traveled by the vehicle 100 that the vehicle 100 is driving on a relatively extended curve on a highway, and therefore the vehicle 100 will only be decelerated relatively little. It can thus be predicted that the upcoming recuperation process only has a relatively small amount of recuperation energy, so that switching on the second electric machine 112 can be omitted.

The driver assistance sensor (DAS) system 102 of a vehicle 100 (in particular for distance measurement, for recognizing traffic signs, traffic signals, etc.) and/or a digital map from a navigation system of the vehicle 100 can thus be used to predict the target driving speed of the vehicle 100 during a deceleration process (for example, before a curve or before a turnoff). Based on the actual driving speed and the predicted target driving speed of the vehicle 100, the amount of recuperation energy for the deceleration process can then be predicted. In particular, it can be predicted on the basis of the actual driving speed and the predicted target driving speed whether dedicated switching on of the second electric machine 112 especially for the recuperation process is energetically advisable or not.

The apparatus 101 can be configured to check, additionally and partially independently of the efficiency consideration during a recuperation process, whether the target speed of the vehicle 100 is to be reached in a relatively short time (with a relatively high deceleration) or in a relatively long time (with a relatively low deceleration). In the case of a relatively high recuperative vehicle deceleration, the first electric machine 111 (depending on the performance design of the first electric machine 111) typically cannot provide the required deceleration torque alone. Furthermore, in particular in the case of a wet or slick roadway, a driving-dynamic destabilization of the vehicle 100 can occur during recuperation via only one axle 111.

The apparatus 101 can be configured to ascertain the drive slip or the slip during single-axle recuperation on the basis of a comparative observation of the wheel speeds of the first axle 121 (measured by a first wheel speed sensor 141) and the second axle 122 (measured by a second wheel speed sensor 142) between the wheels of the coupled first drive axle 121 and the wheels of the freely rotating second axle 122.

Based on the comparative observation and/or from a ratio calculation with the respective drive or recuperation torques during a present driving situation and/or a very recent driving situation, a measure of the driving stability and of the reserve of the driving stability can be ascertained.

In dependence on the predicted driving stability for the recuperation process, the activation threshold for the addition of the second electric machine for the recuperation can be adjusted, in particular reduced (possibly even if the solely energetic consideration in the case of a comparatively high roadway coefficient of friction would not yet have resulted in advisable activation of the second recuperation axle 122). The driving stability of the vehicle 100 can thus be increased in an efficient manner.

Figure 2:
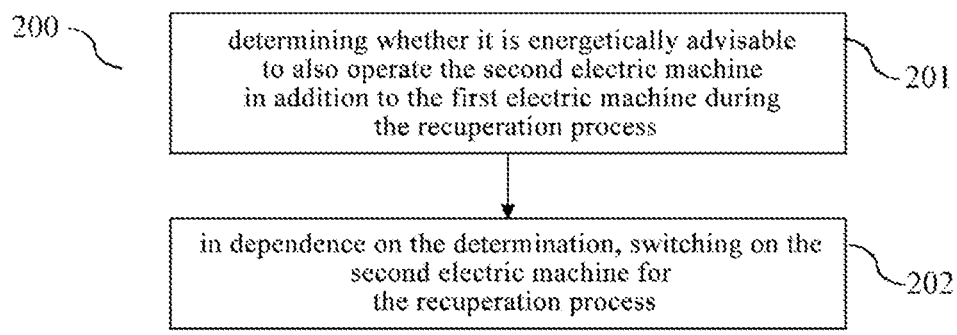
FIG. 2 shows a flow chart of an exemplary method for operating the electric machines of a vehicle during a recuperation process.

FIG. 2 shows a flow chart of an exemplary (computer-implemented) method 200 for operating or controlling an electric machine 112 (for example, a separately-excited synchronous machine) of a vehicle 100 during a recuperation process (or during a deceleration process of the vehicle 100). The vehicle 100 comprises a first electric machine 111, which is coupled to a first axle 121 (for example, the rear axle) of the vehicle 100. The first electric machine 111 can be permanently coupled to the first axle 121 here, in particular in such a way that the first electric machine 111 is possibly used automatically during a deceleration process or a recuperation process, respectively, for deceleration and/or recuperation.

Furthermore, the vehicle 100 comprises a second electric machine 112, which can be coupled to a second axle 122 (for example, the front axle) of the vehicle 100. For this purpose, the vehicle 100 can have a clutch 132 or a transmission which is designed to couple the second electric machine 112 if needed to the second axle 122 or decouple it from the second axle 122. A drag torque caused by the second electric machine 112 can be reduced or avoided by the decoupling of the second electric machine 112, for example, if needed, in particular in the drive case or during free rolling.

The method 200 comprises the determination 201, on the basis of sensor data from one or more sensors 102, 103, 104 of the vehicle 100, whether the second electric machine 112 should also be used in addition to the first electric machine 111 during a (present or directly upcoming) recuperation process for recuperating electric energy. In this case, in particular the sensor data from one or more driving sensors 104 (in particular from a speed sensor), from one or more surroundings sensors 102 (in particular from a radar sensor and/or from an image camera), and/or from a position sensor 103 can be used. On the basis of the sensor data, in particular information with respect to the amount of recuperation energy to be recuperated during the recuperation process can be predicted. Based thereon, it can then be determined whether the amount of recuperation energy to be recuperated is sufficiently high so that the amount of activation energy required for activating the second electric machine 112 can at least be recuperated again by the second electric machine 112 in the scope of the recuperation process (and thus the additional use of the second electric machine 112 for the recuperation process is energetically advisable).

The method 200 furthermore comprises, in dependence on the determination 201, the (selective) operation 202 of the second electric machine 112 during the recuperation process to recuperate electric energy. In particular, for this purpose the second electric machine 112 can be coupled to the second axle 122 and possibly supplied with an exciter current when it has been determined that the second electric machine 112 should be used during the recuperation process. On the other hand, it can be effectuated that the second electric machine 112 remains decoupled from the second axle 122 and/or is not supplied with an exciter current if it has been determined that the second electric machine 112 should not be used during the recuperation process.

Following the recuperation process, the second electric machine 112 can possibly be decoupled from the second axle 122 again and/or the exciter current through the second electric machine 112 can be ended.

The extent of electric energy which can be recuperated by a vehicle 100 having multiple electric machines 111, 112 can be increased by the measures described in this document. Furthermore, the driving stability of the vehicle 100 during a recuperation process can be increased in that the deceleration forces are distributed onto both axles 121, 122 and the transmittable lateral forces are thus utilized more uniformly (without using an additional friction brake).

The present invention is not restricted to the exemplary embodiments shown. In particular, it is to be noted that the description and the figures are only to illustrate the principle of the proposed methods, apparatuses, and systems by way of example.

The invention claimed is:

1. An apparatus for operating an electric machine of a vehicle during a recuperation process, the apparatus comprising:
    a processor, wherein the apparatus is configured:
        to predict, based on sensor data from one or more sensors of the vehicle, an amount of recuperation energy which can be recuperated during the recuperation process;
        to determine, based on the predicted amount of recuperation energy, whether to operate a second electric machine in addition to a first electric machine during the recuperation process for recuperating electric energy; and
        based on the determination, to operate the second electric machine during the recuperation process in order to recuperate electric energy, wherein:
    the first electric machine is coupled to a first axle of the vehicle, and
    the second electric machine is couplable to a second axle of the vehicle.

2. The apparatus according to claim 1, wherein the apparatus is further configured to determine, based on the sensor data with respect to an actual driving speed of the vehicle at a beginning of the recuperation process, whether to operate the second electric machine in addition to the first electric machine during the recuperation process.

3. The apparatus according to claim 2, wherein the apparatus is further configured:
    to determine to operate the second electric machine in addition to the first electric machine during the recuperation process if the actual driving speed is greater than or equal to a speed threshold value; and/or
    to determine not to operate the second electric machine during the recuperation process if the actual driving speed is less than the speed threshold value.

4. The apparatus according to claim 2, wherein the apparatus is further configured:
    to predict a target driving speed of the vehicle at an end of the recuperation process based on the sensor data from the one or more sensors of the vehicle; and
    to determine, based on the actual driving speed at the beginning of the recuperation process and based on the predicted target driving speed at the end of the recuperation process, whether to operate the second electric machine in addition to the first electric machine during the recuperation process.

5. The apparatus according to claim 1, wherein the apparatus is further configured, based on the sensor data with respect to a position of the vehicle and based on a digital map with respect to a road network traveled by the vehicle:
    to predict a target driving speed of the vehicle at an end of the recuperation process; and/or
    to determine whether to operate the second electric machine in addition to the first electric machine during the recuperation process.

6. The apparatus according to claim 1, wherein the apparatus is further configured, based on a driving route of the vehicle planned on a navigation system of the vehicle and based on the sensor data with respect to a position of the vehicle:
    to predict a target driving speed of the vehicle at an end of the recuperation process; and/or
    to determine whether to operate the second electric machine in addition to the first electric machine during the recuperation process.

7. The apparatus according to claim 1, wherein the apparatus is further configured, based on the sensor data with respect to a front vehicle driving in front of the vehicle:
    to predict a target driving speed of the vehicle at an end of the recuperation process; and/or
    to determine whether to operate the second electric machine in addition to the first electric machine during the recuperation process.

8. The apparatus according to claim 1, wherein the apparatus is further configured:
    based on the predicted amount of recuperation energy, and in dependence on a comparison of the predicted amount of recuperation energy to an energy threshold value, to determine whether to operate the second electric machine in addition to the first electric machine during the recuperation process.

9. The apparatus according to claim 1, wherein the apparatus is further configured, when it has been determined to operate the second electric machine in addition to the first electric machine during the recuperation process:
    to cause the second electric machine to be coupled to the second axle for the recuperation process; and/or
    to supply an exciter current to the second electric machine for the recuperation process.

10. The apparatus according to claim 1, wherein the apparatus is further configured, based on the sensor data of the one or more sensors of the vehicle, to determine whether to operate the second electric machine for recuperating electric energy in addition to the first electric machine to ensure a driving stability of the vehicle during the recuperation process.

11. The apparatus according to claim 10, wherein the apparatus is further configured:
   based on the sensor data of the one or more sensors of the vehicle, to ascertain information with respect to a coefficient of friction of a roadway traveled by the vehicle and/or information with respect to a deceleration value to be caused during the recuperation process; and
   based on the information, to determine whether to operate the second electric machine for recuperating electric energy in addition to the first electric machine to ensure the driving stability of the vehicle during the recuperation process.

12. A method for operating an electric machine of a vehicle during a recuperation process, the method comprising:
   predicting, based on sensor data from one or more sensors of the vehicle, an amount of recuperation energy which can be recuperated during the recuperation process;
   determining, based on the predicted amount of recuperation energy, to operate a second electric machine in addition to a first electric machine recuperation process for recuperating electric energy; and
   operating the second electric machine during the recuperation process in order to recuperate the electric energy, wherein:
   the first electric machine is coupled to a first axle of the vehicle, and
   the second electric machine is couplable to a second axle of the vehicle.

13. An apparatus for operating an electric machine of a vehicle during a recuperation process, the apparatus comprising:
   a processor, wherein the apparatus is configured:
      to predict, based on sensor data from one or more sensors of the vehicle, a target driving speed of the vehicle at an end of the recuperation process;
      to determine, based on an actual driving speed of the vehicle at a beginning of the recuperation process and based on the predicted target driving speed at the end of the recuperation process, whether to operate a second electric machine in addition to a first electric machine during the recuperation process for recuperating electric energy; and
      based on the determination, to operate the second electric machine during the recuperation process in order to recuperate electric energy, wherein:
   the first electric machine is coupled to a first axle of the vehicle, and
   the second electric machine is couplable to a second axle of the vehicle.

* * * * *